United States Patent
Moore et al.

(10) Patent No.: US 7,523,062 B2
(45) Date of Patent: Apr. 21, 2009

(54) SECURITIES PROCESSOR AND A METHOD OF PROCESSING ATTRIBUTABLE INTEREST MESSAGES

(75) Inventors: Daniel F. Moore, New Haven, CT (US);
John T. Hughes, Jr., Stratford, CT (US);
Fred Steining, Derby, CT (US); Stuart Richard Serkin, Fairfield, CT (US);
Timothy Vincent, Shelton, CT (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 1212 days.

(21) Appl. No.: 10/206,129

(22) Filed: Jul. 25, 2002
(Under 37 CFR 1.47)

(65) Prior Publication Data
US 2003/0229566 A1 Dec. 11, 2003

Related U.S. Application Data

(60) Provisional application No. 60/385,979, filed on Jun. 5, 2002, provisional application No. 60/385,988, filed on Jun. 5, 2002.

(51) Int. Cl.
*G06Q 40/00* (2006.01)
(52) U.S. Cl. .............................. 705/37; 705/38; 705/36; 705/35
(58) Field of Classification Search ............... 705/26, 705/80, 36, 34, 35–38; 709/217
See application file for complete search history.

(56) References Cited

U.S. PATENT DOCUMENTS

| 5,812,988 | A * | 9/1998 | Sandretto ................. 705/36 R |
| 6,247,000 | B1 * | 6/2001 | Hawkins et al. ................ 705/37 |
| 7,167,844 | B1 * | 1/2007 | Leong et al. ................... 705/80 |
| 7,318,045 | B2 * | 1/2008 | Baecker et al. ................. 705/37 |
| 2001/0034686 | A1 * | 10/2001 | Eder ............................ 705/36 |
| 2003/0083973 | A1 * | 5/2003 | Horsfall ........................ 705/37 |
| 2004/0034591 | A1 * | 2/2004 | Waelbroeck et al. .......... 705/37 |

OTHER PUBLICATIONS

Facing A new Reality: The SIA Conference addresses changing technology needs in a changing world. Editorial Staff. Traders Magazine. New York: Jun. 1, 2002. p. 1.*

* cited by examiner

*Primary Examiner*—Frantzy Poinvil
*Assistant Examiner*—Clement Graham
(74) *Attorney, Agent, or Firm*—Fish & Richardson P.C.

(57) ABSTRACT

A securities processor includes a prematching process for validating an attributable security interest message placed by a market participant on a securities trading system This attributable security interest message relates to an individual security chosen from a plurality of securities traded on the securities trading system. A matching queue receives the validated attributable security interest message from the prematching process, and queues it for subsequent matching. A matching process obtains the validated attributable security interest message from the matching queue and compares it with previously-validated attributable security interest messages to determine if a match occurs between the validated attributable security interest message and one of the previously-validated attributable security interest messages.

37 Claims, 5 Drawing Sheets

US 7,523,062 B2

SECURITIES PROCESSOR AND A METHOD OF PROCESSING ATTRIBUTABLE INTEREST MESSAGES

RELATED APPLICATIONS

This application claims the priority of: U.S. Provisional Patent Application No. 60/385,979, entitled "Supermontage Architecture", and filed on Jun. 5, 2002; and U.S. Provisional Patent Application No. 60/385,988, entitled "Security Processor", and filed on Jun. 5, 2002.

BACKGROUND

This invention relates to electronic based securities trading, and more particularly to processing of information relating to electronic securities trading.

Electronic equity markets, such as The Nasdaq Stock Market™ collect, aggregate, and display pre-trade information to market participants. In the Nasdaq Stock Market, for example, this pre-trade information takes the form of a quote that represents a single or an aggregate of same-priced principal or agency orders. A market, such as The Nasdaq Stock Market™, also provides trading platforms through which market participants may trade securities in the marketplace.

SUMMARY

According to an aspect of this invention, a securities processor includes a prematching process for validating an attributable security interest message placed by a market participant on a securities trading system. This attributable security interest message relates to an individual security chosen from a plurality of securities traded on the securities trading system. A matching queue receives the validated attributable security interest message from the prematching process, and queues it for subsequent matching. A matching process obtains the validated attributable security interest message from the matching queue and compares it with previously-validated attributable security interest messages to determine if a match occurs between the validated attributable security interest message and one of the previously-validated attributable security interest messages.

One or more of the following features may also be included. The attributable security interest message is a security order and the prematching process includes a order entry process. This order entry process includes a validity determination process that receives the security order and validates it to confirm that it is eligible for matching. The order entry process includes an order writing process for writing the validated security order to the matching queue.

The attributable security interest message is a security quote and the prematching process includes a quote entry process. This quote entry process includes a validity determination process that receives the security quote and validates it to confirm that it is eligible for matching. The quote entry process includes an quote writing process for writing the validated security quote to the matching queue.

The matching queue is a first-in, first-out queue maintained on a non-volatile memory.

A delivery authorization process, responsive to the matching process determining that a match exists between the validated attributable security interest message and one of the previously-validated attributable security interest messages, requests a transaction authorization from the market participant. An execution reporting process, which is responsive to the delivery authorization process receiving a transaction authorization message from the market participant, generates a trade authorization message concerning the attributable security interest messages matched by the matching process. This trade authorization message is provided to a trade execution process.

The matching process includes an order management process for managing the validated attributable security interest messages obtained from the matching queue. The order management process is configured to process the attributable security interest messages that are supervisory commands.

The matching process includes an order book, responsive to the order management process, for storing the validated attributable security interest messages obtained from the matching queue. This order book is maintained on a main memory device and is exclusively accessible by the order management process. The order management process is configured to remove from the order book any attributable security interest messages that were matched by the matching process. An activity log file management process, responsive to the order management process, maintains an activity log file that specifies the chronological changes made to the order book by the order management process.

An order file builder process accesses the activity log file, such that the order file builder process uses the chronological change information included in the order activity log file to generate an order book recovery file. A match log file management process, responsive to the order management process, maintains a match log file that specifies the matches made by the matching process.

According to a further aspect of this invention, a method of processing attributable interest messages includes validating an attributable security interest message placed by a market participant on a securities trading system. This attributable security interest message relates to an individual security chosen from a plurality of securities traded on the securities trading system. The validated attributable security interest message is queued on a matching queue for subsequent matching. The validated attributable security interest message is then obtained from the matching queue, and compared with previously-validated attributable security interest messages to determine if a match occurs between it and one of the previously-validated attributable security interest messages.

One or more of the following features may also be included. The attributable security interest message is a security order and validating includes receiving the security order, and validating it to confirm that it is eligible for matching. Validating further includes writing the validated security order to the matching queue.

The attributable security interest message is a security quote and validating includes receiving the security quote, and validating it to confirm that it is eligible for matching. Validating further includes writing the validated security quote to the matching queue.

The matching queue is a first-in, first-out queue maintained on a non-volatile memory.

A transaction authorization is requested from the market participant whenever a match exists between the validated attributable security interest message and one of the previously-validated attributable security interest messages. A trade authorization message is generated concerning the matched attributable security interest messages in response to receiving a transaction authorization message from the market participant, This trade authorization message is provided to a trade execution process.

The validated attributable security interest messages obtained from the matching queue are managed. The attributable security interest message is a supervisory command.

The validated attributable security interest messages obtained from the matching queue are stored on an order book. Any attributable security interest messages that were matched are removed from the order book.

An activity log file is maintained that specifies the chronological changes made to the order book. The chronological change information included in the activity log file is accessed and used to generate an order book recovery file. A match log file is maintained that specifies the attributable security interest messages that were matched.

According to a further aspect of this invention, a computer program product residing on a computer readable medium has a plurality of instructions stored on it. When executed by the processor, these instructions cause that processor to validate an attributable security interest message placed by a market participant on a securities trading system. This attributable security interest message relates to an individual security chosen from a plurality of securities traded on the securities trading system. The validated attributable security interest message are queued on a matching queue for subsequent matching. This validated attributable security interest message is then obtained from the matching queue and compared with previously-validated attributable security interest messages to determine if a match occurs between it and one of the previously-validated attributable security interest messages.

One or more of the following features may also be included. The attributable security interest message is a security order, and the computer program product includes instructions to receive and validate the security order to confirm that it is eligible for matching.

The attributable security interest message is a security quote, and the computer program product includes instructions to receive and validate the security quote to confirm that it is eligible for matching.

The computer program product includes instructions to request a transaction authorization from the market participant in response to a match existing between the validated attributable security interest message and one of the previously-validated attributable security interest messages. The computer program product further includes instructions to generate a trade authorization message concerning the attributable security interest messages matched in response to receiving a transaction authorization message from the market participant. This trade authorization message is provided to a trade execution process.

The computer program product includes instructions to store the validated attributable security interest messages obtained from the matching queue on an order book. The computer program product includes instructions to remove from the order book any attributable security interest messages that were matched. The computer program product includes instructions to maintain an activity log file that specifies the chronological changes made to the order book.

The computer program product includes instructions to access the activity log file and use the chronological change information included in the activity log file to generate an order book recovery file. The computer program product includes instructions to maintain a match log file that specifies the attributable security interest messages matched.

One or more advantages can be provided from the above. By splitting the processing of trades amongst numerous securities processors, system throughput can be increased. Further, the use of modular securities processors allows for a system that can grow and expand in accordance with its needs.

DETAILED DESCRIPTION

Figure 1:
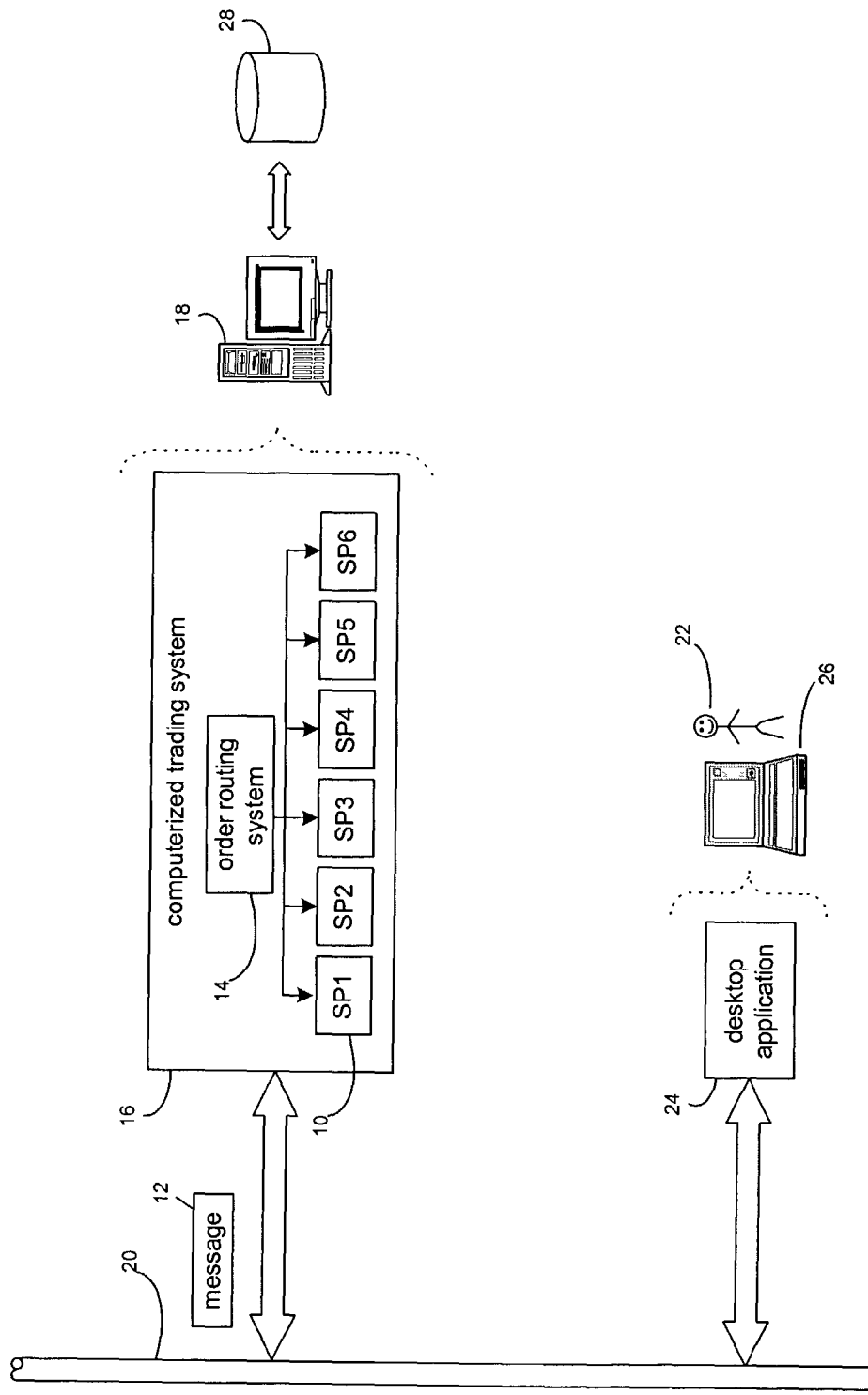
FIG. 1 is a block diagram of a computerized trading system including a securities processor and an order routing system.

Referring to FIG. 1, there is shown a securities processor 10 that processes attributable security interest messages 12 concerning a specific security received from an order routing system 14. Securities processor 10 and order routing system 14 are incorporated into and part of a computerized trading system 16 that trades securities, including the specific security that is the subject of received message 12. The securities processor 10 processes the attributable security interest messages 12 and effectuates the trading of the security. By assigning certain securities to certain securities processors, a single securities processor is not required to process all of the attributable security interest messages 12 handled by the computerized trading system 16. Accordingly, the load distribution amongst the securities processors within the system can be controlled and the efficiency and throughput of the system can be enhanced.

Securities processor 10 and order routing system 14 reside on a server 18 that is connected to network 20 (e.g., the Internet, an intranet, a local area network, some other form of network, etc.). Computerized trading system 16, which trades securities electronically, processes trades (e.g., message 12) entered by various market participants (e.g., market participant 22). Market participant 22 typically accesses and uses computerized trading system 16 via a desktop application 24 (e.g., Microsoft Internet Explorer Netscape Navigator™, the Nasdaq Workstation II™, a specialized desktop interface, etc.) running on computer 26, thus allowing market participant 22 to trade securities with other market participants (not shown).

The instruction sets and subroutines of securities processor 10 and order routing system 14 are typically stored on a storage device 28 connected to server 18. Additionally, computerized trading system 16 stores all information relating to securities trades on storage device 28. Storage device 28 can be a hard disk drive, a tape drive, an optical drive, a RAID array, a random access memory (RAM), or a read-only memory (ROM), for example.

Server 18 includes at least one central processing unit (not shown) and main memory system (not shown). Typically, server 18 is a multi-processing, fault-tolerant system that includes multiple central processing units that each have a dedicated main memory system or share a common main memory pool. While being executed by the central processing unit(s) of server 18, order routing system 14 and multiple instantiations of securities processor 10 reside in the main memory system of server 18. Further, the processes and subroutines of securities processor 10 and order routing system 14 may also be present in various levels of cache memory incorporated into server 18.

Figure 2:
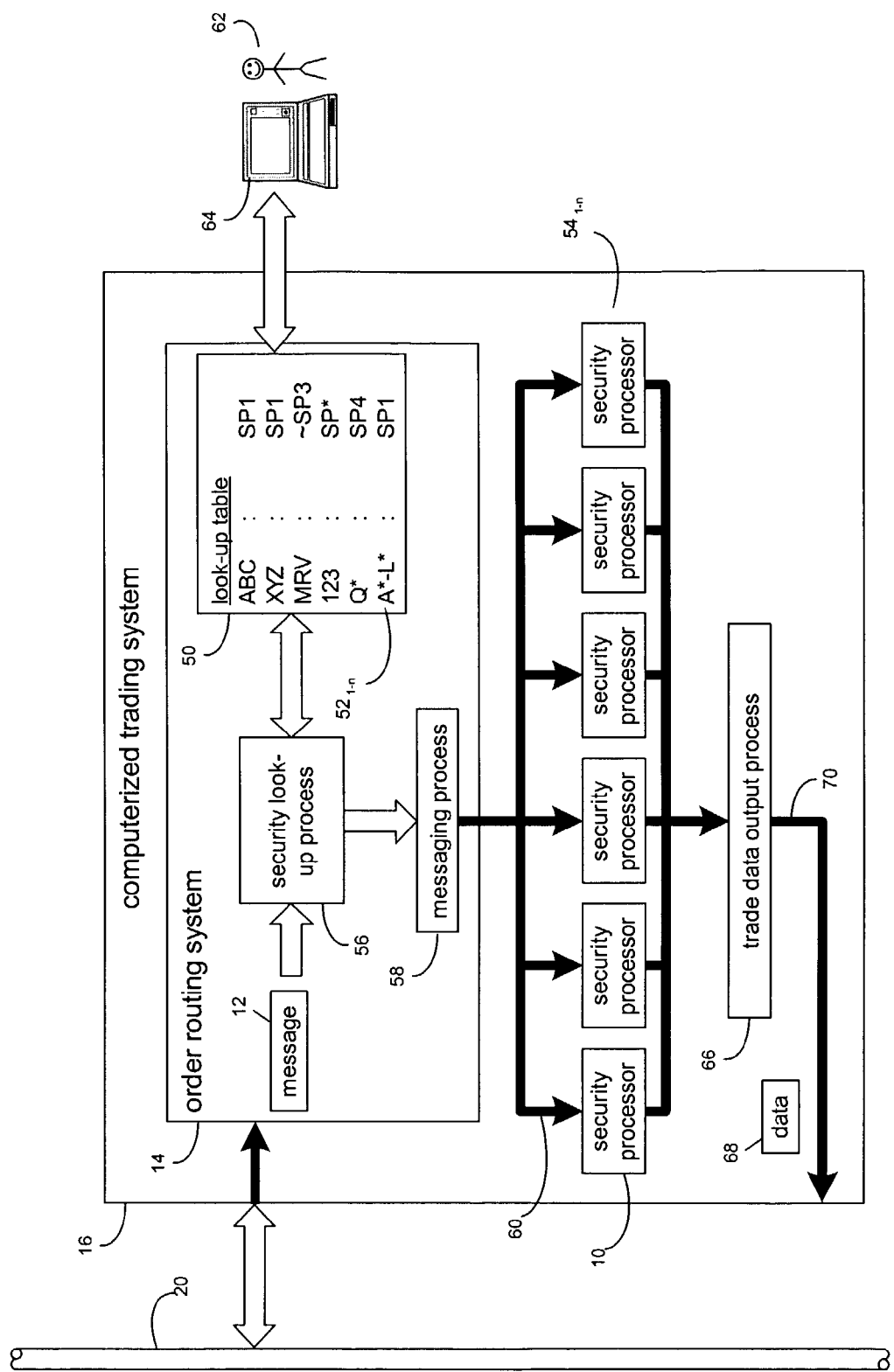
FIG. 2 is a block diagram of the order routing system.

Referring to FIG. 2, order routing system 14 includes a configurable look-up table 50 that includes assignment entries $52_{1-n}$ that assign each of the securities traded on computerized trading system 16 to one or more securities processors $54_{1-n}$ (e.g., securities processor 10). Look-up table 50 can be configured in various forms. For example, table 50 can be a multi-column, multi-row text-based ASCII (i.e., American Standard Code for Information Interchange) file that is accessed to determine the assigned securities processor. Alternatively, look-up table 50 may be a database from which a query is made concerning the security and the appropriate database record is retrieved, such that this database record specifies the securities processor to which that specific security is assigned. Other file arrangements/structures are also possible, such as a comma delimited text file.

During the course of the trading day and, possibly, before and after the trading day, market participants (e.g., market participant 22) place orders/quotes (e.g., message 12) for securities traded on computerized trading system 16. These orders/quotes, which are typically in the form of messages (e.g., message 12), include several pieces of information, such as: the name of the market participant who placed the order/quote; a symbol (or some other identifier) for the security being sought for purchase or offered for sale; and a quantity indicator concerning the number of shares sought for purchase or offered for sale, for example.

When a market participant 22 places a message 12, this order/quote is transmitted to computerized trading system 16 via network 20. Upon receipt of message 12 by order routing system 14, a security look-up process 56 parses message 12 to determine the security to which the order/quote relates. Typically, security-look-up process 56 will examine message 12 to find a ticker symbol (or some other identifier) for the security to which the order pertains. Assume that, for this example, message 12 pertains to one-hundred shares of XYZ Corp. that Market Participant A wishes to purchase for $17.00 per share. Security look-up process 56 parses this order and extracts the ticker symbol XYZ that is included in the message body. Alternatively, some other form of identifier can be used (e.g., a binary identifier) provided that assignment entries $52_{1-n}$ use these identifiers to assign the securities processors.

Security look-up process 56 accesses configurable look-up table 50 to determine the securities processor to which ticker symbol XYZ is assigned. As is shown in configurable look-up table 50, security XYZ is assigned to securities processor SP1. Depending on the structure of table 50 (e.g., ASCII table, database, text file, etc), security look up process 56 may scan table 50 (if it is an ASCII table or text file), or may launch a query (if it is a database) to determine which securities processor the security is assigned to. Once this determination is made, messaging process 58 populates the header of the message to include an identifier for the appropriate securities processor. Alternatively, if message 12 does not already include an empty header, the message may be appended to include a header that identifies the assigned securities processor. Once this process is complete, message 12 is broadcast over bus 60 to the assigned securities processor (securities processor 10, for example).

Figure 3:
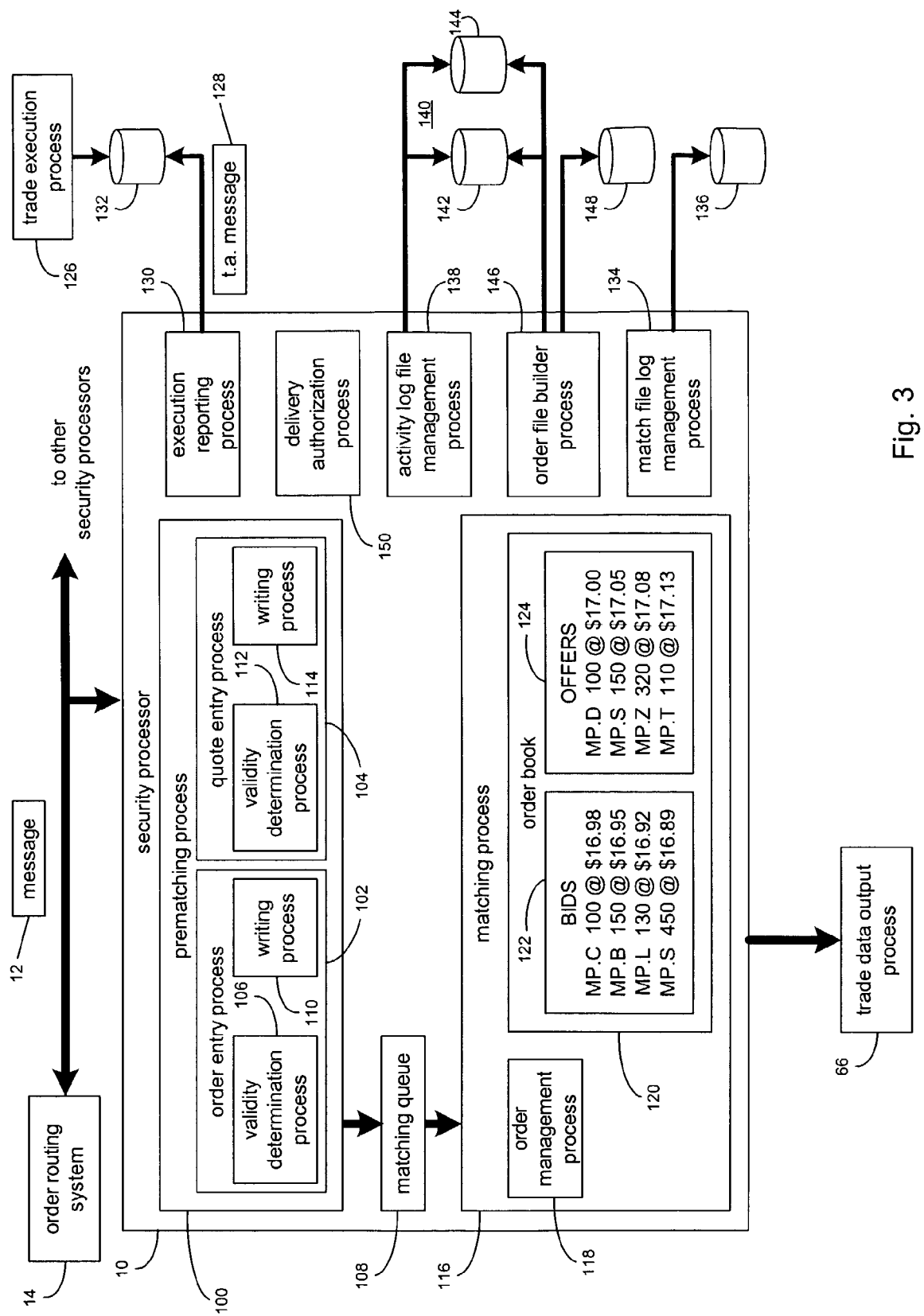
FIG. 3 is a block diagram of the securities processor.

Referring to FIG. 3, once message 12 is received by the securities processor 10, a check is performed by prematching process 100 to make sure that the order/quote passes certain preliminary checks (e.g., order eligibility, order syntax, etc.). The specifics of the checks being performed and the action taken in response to a failure is configured by administrator 62 using computer 64. Typically, if an order/quote fails any of these checks, the order is rejected and the market participant who placed the order is notified.

Prematching process 100 includes order entry process 102 and a quote entry process 104. If message 12 relates to an order that market participant 22 entered, order entry process 102 receives and processes the message 12. Order entry process 102 includes a validity determination process 106 that performs the preliminary checks described above. If the message passes these preliminary checks, this validated message is placed (i.e., written) into a matching queue 108 by a writing process 110. Alternatively, if message 12 represents a quote, a quote entry process 104 receives and processes message 12. A validity determination process 112 receives and validates the quote. Once validated, the validated message is written into the matching queue 108 by writing process 114.

Matching queue 108 functions as a temporary storage area for those messages that were received and validated by the securities processor but not yet processed. Matching queue 108 additionally has other pending orders, quotes, and supervisory commands for the securities assigned to the securities processor. Matching queue 108 is typically a first-in, first-out (FIFO) buffer, in which the message wait in line to be processed. Matching queue 108 is typically configured in a non-volatile storage, such as storage device 28.

Once queued by matching queue 108, these messages/commands wait in line to be processed by matching process 116. When available, matching process 116 retrieves the next-in-line message/command (message 12, for example) so that it could be processed.

As stated above, in this example, message 12 pertains to one-hundred shares of XYZ Corp. that Market Participant A wishes to purchase for $17.00 per share. This order, which represents a bid-to-buy XYZ Corp. (hereinafter "a bid"), will be entered into the order book 118 for securities processor 12 for subsequent matching with a corresponding offer-to-sell XYZ Corp (hereinafter "a offer").

Matching process 116 includes an order management process 118 for managing and maintaining the validated messages (such as message 12) received from matching queue 108. These validated messages are entered into an order book 120, which is exclusively controlled by the order management process 118 of matching process 116. Typically, order book 120 is stored in a exclusive portion of the main memory of server 18, such that this portion of the main memory is only accessible by the order management process 118 of matching process 116.

Order book 120 includes two logical portions, a bid-side portion 122 and an ask-side portion 124. Whenever a message is validated concerning a bid, the relevant information (e.g., market participant identifier, quantity of shares, bid price, etc.) pertaining to that message is placed into the bid-side portion 122 of order book 120. Conversely, whenever a message is validated concerning an offer, the relevant information (e.g., market participant identifier, quantity of shares, ask price, etc.) pertaining to that message is placed into the ask-side portion 124 of order book 120.

During the course of the day, the trade value of the security (XYZ Corp., for example) will vary as market conditions fluctuate. Whenever a market participant is offering a security for sale at the same price that another market participant is willing to pay for the security, matching process 116 matches the bid and the offer. Once this match occurs, the trade can be executed by a trade execution process 126. However, if the highest-price (i.e., best price) bid is lower than the lowest-price (i.e., best price) offer, no match will occur and, therefore, the security will not be traded. These pending bids and offers will remain on that security's order book 120. This price differential between the lowest-price offer and the highest-price bid is commonly referred to as the "spread". For order book 120, the price spread is $0.02, as Market Participant C has a pending (i.e., unmatched) bid to buy one-hundred shares for $16.98 per share, and Market Participant D has a pending offer to sell one-hundred shares for $17.00 per share.

Therefore, until something changes (i.e., Market Participant C raises their bid to $17.00, Market Participant D lowers their offer to $16.98, the two market participant meet at $16.99, or a third party makes a $17.00 bid or a $16.98 offer or sends in a market order on either side of the market), no trades will occur.

Order management process 118 is configured so that if a supervisory command is retrieved from matching queue 108, order management process 118 executes that supervisory command. For example, if a "stop trading" command is received for all securities assigned to securities processor 10, order management process 118 will stop matching process 116 for all securities handled by that securities processor, effectively stopping all trading for that securities processor. If each securities processor simultaneously received the same supervisory command, all trading on computerized trading system 16 would cease. Further, if a "stop trading" command is received for a specific security assigned to securities processor 10, order management process 118 will shut down matching process 116 for that particular security while allowing any other matching processes being handled by securities processor 10 to continue.

Continuing with the above-stated example, when message 12 is retrieved from matching queue 108, as it is a bid to buy one-hundred shares of XYZ Corp. for $17.00 per share, it is placed into the bid-side 122 of order book 120. Once placed on order book 120, this unmatched bid is matched with an unmatched offer, namely the outstanding offer to sell one-hundred shares of XYZ Corp. for $17.00 per share that was placed by Market Participant D.

Assuming that neither of the two market participants involved in this match have requested a delivery notification (to be discussed below), a trade authorization message 128, which is generated by an execution reporting process 130, is transmitted to an execution trigger (i.e., a log file) 132 accessible by a trade execution process 126. Trade execution process 126 effectuates the trade by transferring ownership of the shares of XYZ Corp. from the seller's to the buyer's account, and transferring funds from the buyer's to the seller's account. Once a bid or an offer is matched, order management process 118 removes it from order book 120, as it is no longer available for matching.

A match file log management process 134 maintains a match log file 136 that itemizes the matches made by matching process 116. An activity log file management process 138 maintains an activity log file 140 that specifies the chronological changes made to the order book 120 by the order book management process 118. The activity log file 140 is typically split into two separate files or portions, an order log activity file 142 and a quote log activity file 144. Therefore, whenever changes are made to the order book 120 due to messages concerning orders, these changes are specified in the order log activity file 142. Conversely, whenever changes are made to the order book 120 due to messages concerning quotes, these changes are specified in the quote log activity file 144. Typically, the log activity files 142, 144 are appended each time a change is made to the order book 120 and, therefore, provide a chronological sequence of changes made to the order book 120 during the trading day. An order file builder process 146 accesses the chronological information included in activity log files 142, 144 to build an order book recovery file 148 that is used to recreate/restore order book 120 in the event of a hardware or data failure on server 18. This order book recovery file is assembled by examining the sequence of events to determine if a bid or offer is still pending on the order book.

As stated above, message 12 pertains to one-hundred shares of XYZ Corp. that Market Participant A wishes to purchase for $17.00 per share. When this unmatched bid was placed on order book 120, the order book was modified to include this bid. This unmatched bid was subsequently matched with an unmatched offer previously written to order book 120, namely the outstanding offer to sell one-hundred shares of XYZ Corp. for $17.00 per share that was placed by Market Participant D. Once this match occurred, the bid by Market Participant A and the offer by Market Participant D were both removed from order book 120. Therefore, the order activity log file 142 would indicate the following: an offer by Market Participant D was written to order book 120; a bid by Market Participant A was written to order book 120; and this bid and this offer were both subsequently removed from the order book 120. Accordingly, these four pieces of chronological information would be processed by order file builder process 146 when creating order book recovery file 148, which would show that the order book 120 does not currently contain either the offer made by Market Participant D or the bid made by Market Participant A.

As stated above, market participants may request that a delivery notification be sent to them prior to processing their bid/offer. For example, once matching process 116 matches an offer with a bid, the owner of the offer and/or the owner of the bid can be notified to request authorization to execute the trade. Therefore, when the match described above between Market Participant A and Market Participant D occurred, a delivery authorization process 150 may request from either or both of the market participants an authorization to have the trade effectuated. If either or both market participants requested this authorization, delivery authorization process 150 would request a transaction authorization from either or both of them. In this scenario, only once this transaction authorization is received by the securities processor will the trade authorization message 128 be sent to the execution trigger 132.

Whenever a match occurs, an order fails to match with another outstanding offer within a predetermined period of time (e.g., immediately, during the trading day, etc.), or an order is rejected by prematching process 100, a trade data output process 66 transmits trade data 68 to the market participant who placed the order. This trade data will vary depending on the action taken by securities processor 10. For example, if the order was rejected, the market participant will typically receive a message specifying that the order was rejected and the reasons for the rejection (e.g., negative volume, negative share price, etc.). If the order was executed, the market participant may receive a message specifying that the order was executed and defining the number of shares sold and the per-share price. Further, if the order failed to execute, the message received by the market participant would typically specify the reason for the failure (e.g., order did not execute immediately, order did not execute by the close of trading, etc.). These notification messages are broadcast across output bus 70 connected to network 14.

An administrator 62 (via computer 64 and a configuration utility running on it) can configure and reconfigure configurable look-up table 50 to vary the load distribution between the securities processors $54_{1-n}$ or the overall load of the computerized trading system 16. The manner in which table 50 is modified varies depending on the configuration of the table. If the table is an ASCII-based table or text file, a simple text or ASCII line editor may be used to assign and reassign securities to various securities processors. Alternatively, if table 50 is configured as a database, database editing/configuration software (such as that offered by Sybase®, Microsoft®, and Oracle®) may be used to add, delete, or modify records within the database.

As explained above, the matching of the orders and quotes placed by the market participants is handled by the securities processors incorporated into computerized trading system 16. The greater the number of securities processors employed, the greater the throughput of computerized trading system 16. Specifically, as the number of securities processors is increased, the number of matches that system 16 is capable of handling is also increased.

As would be expected, bigger well-know securities tend to be traded at higher volumes than smaller less-known securities. Accordingly, administrator 62 may assign one or more of their highest volume securities to a single securities processor, such that another securities processor handles all the remaining securities. Additionally, as the look-up table is reconfigurable, these definitions can be reassigned as trading trends vary. For example, assume that XYZ Corp. is the highest traded stock handled by computerized trading system 16 and, therefore, administrator 62 only assigned XYZ Corp. to the first of the six securities processors, such that the second through the sixth securities processors handle the trades of all other securities traded on the system 16. If, over time, XYZ Corp. starts to trade less frequently and ABC Corp. (another security traded on computerized trading system 16) becomes the highest traded security, administrator 62 could easily reassign XYZ Corp. so that it is processed by any of securities processors two through six, thus freeing up the first securities processor to exclusively process trades of ABC Corp.

Since additional securities processors can be added to system 16 to accommodate higher trade volumes, computerized trading system 16 is scalable. For example, if administrator 62 decided that the load level of all six securities processors were too high and, therefore, reassigning securities from one securities processor to another would not free up any bandwidth, a seventh securities processor can be added to system 16. This new securities processor would be given a unique address or identifier and look-up table 50 would be modified so that one or more securities are assigned to this newly-added securities processor. Additionally, as these securities processor are each autonomous processors that run separately and independently of each other, the new securities processor may be added and tested without jeopardizing the stability of computerized trading system 16. For example, a seventh securities processor may be added and, prior to this newly-added securities processor executing trades of actual securities, it can be tested. A batch test-procedure can be used to trade "test" securities to verify the securities processor's reliability prior to actually using the newly-added securities processor in the system. Once the reliability of the new securities processor is established, look-up table 50 can be modified to assign actual securities to that newly-added securities processor.

Concerning the types of assignment entries $52_{1-n}$ that are included in look-up table 50, these entries may be security-specific assignment entries; dedicated assignment entries; alpha-range assignment entries; or floating assignment entries, for example. Each of these will be discussed below in greater detail.

A security-specific assignment entry is an assignment entry that assigns a specific security (or security symbol) to a specific security processor. An example of a security-specific assignment entry is "XYZ:SP1", in that it assigns security XYZ Corp. to securities processor SP1. However, securities processor SP1 is available to also process trades concerning other securities.

A dedicated assignment entry is an assignment entry that assigns a security to a dedicated securities processor, such that this dedicated securities processor only processes trades concerning that one security. If look-up table 50 does not use wildcards (to be discussed below), every assignment would function as a dedicated assignment until a second security was assigned to the same security processor. An example of this type of dedicated assignment would be "MRV:SP3", since no other security is assigned to securities processor SP3. However, if assignment entries are made that use wildcards (to be discussed below), the dedicated assignment entry would have to indicate that the securities processor is exclusively assigned. An example of this type of dedicated assignment is "MRV:~SP3", such that the "~" prefix before the SP3 would be indicative of the exclusivity and, therefore, prevent wildcard assignments from assigning any other securities to securities processor SP3.

An alpha-range assignment entry is an assignment entry that assigns a range of securities to a specific securities processor. For example, securities beginning with the letters A-L may be assigned to securities processor SP1. The corresponding alpha-range assignments is "A*-L*:SP1". Note the use of the wildcard symbol "*" to identify any combination beginning with a certain character. Further, these alpha-range assignments may specify a range of securities beginning with certain numbers, such as "1*-9*:SP3".

A floating assignment entries is an entry that assigns a specific security to any one of a range of securities processors. For example, security "123" may be assigned to the next-available securities processor. Typically, this type of assignment is performed on lower-priority, lightly-traded securities. An example of this type of floating assignment is "123:SP*", such that the wildcard character is used to represent the securities processor assignment. Note that if such wildcard securities processor assignments are used, any dedicated assignment would have to indicate exclusivity for a securities processor to avoid a floating assignment assigning a security to a dedicated securities processor.

Figure 4:
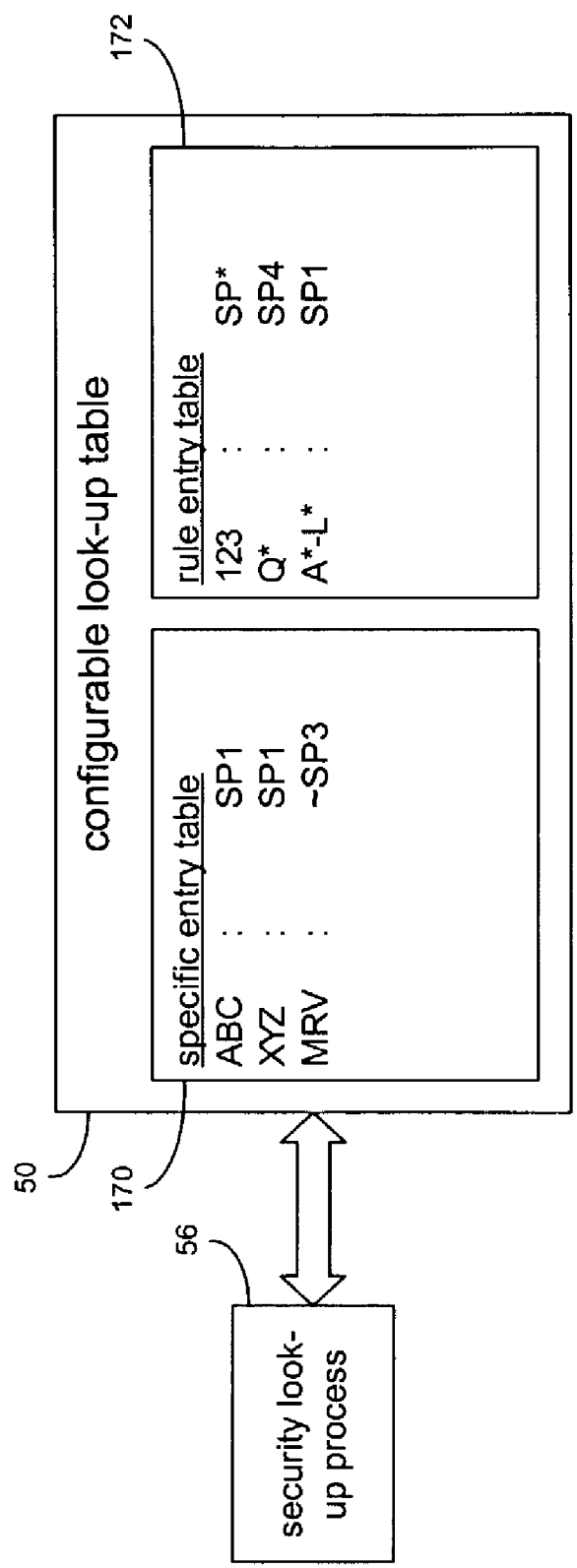
FIG. 4 is a block diagram of a configurable look-up table.

Referring to FIG. 4, look-up table 50 may be configured to include a specific-entry table 170 and a rule-entry table 172. Specific entry table 170 includes security-specific assignment entries (e.g., XYZ:SP1) and dedicated assignment entries (e.g., MRV:~SP3). Rule entry table 172 includes alpha-range assignment entries (e.g., A*-L*:SP1) and floating assignment entries (e.g., 123:SP*).

If look-up table 50 is configured to include a specific entry table 170 and a rule entry table 172, security look-up process 56 is configured to first access and search the specific entry table 170 to determine if it includes an assignment entry for the security associated with a received order. If table 170 includes such an entry, security look-up process 56 will stop searching table 50. However, if table 170 does not include such an entry, security look-up process 56 will access and search rule-entry table 172 to determine if it includes an assignment entry for the security associated with the received order.

While FIGS. 1 and 2 are shown to include six securities processors, the actual number of securities processors varies depending on, among other things, system loading and trade volume of computerized trading system 16.

While specific examples were given concerning security-specific assignment entries, dedicated assignment entries, alpha-range assignment entries, and floating assignment entries, the structure and nomenclature of these entries is for illustrative purposes only. Specifically, administrator 62 and/or the designer of system 16 may choose a nomenclature or syntax that is different than the above-stated examples.

Figure 5:
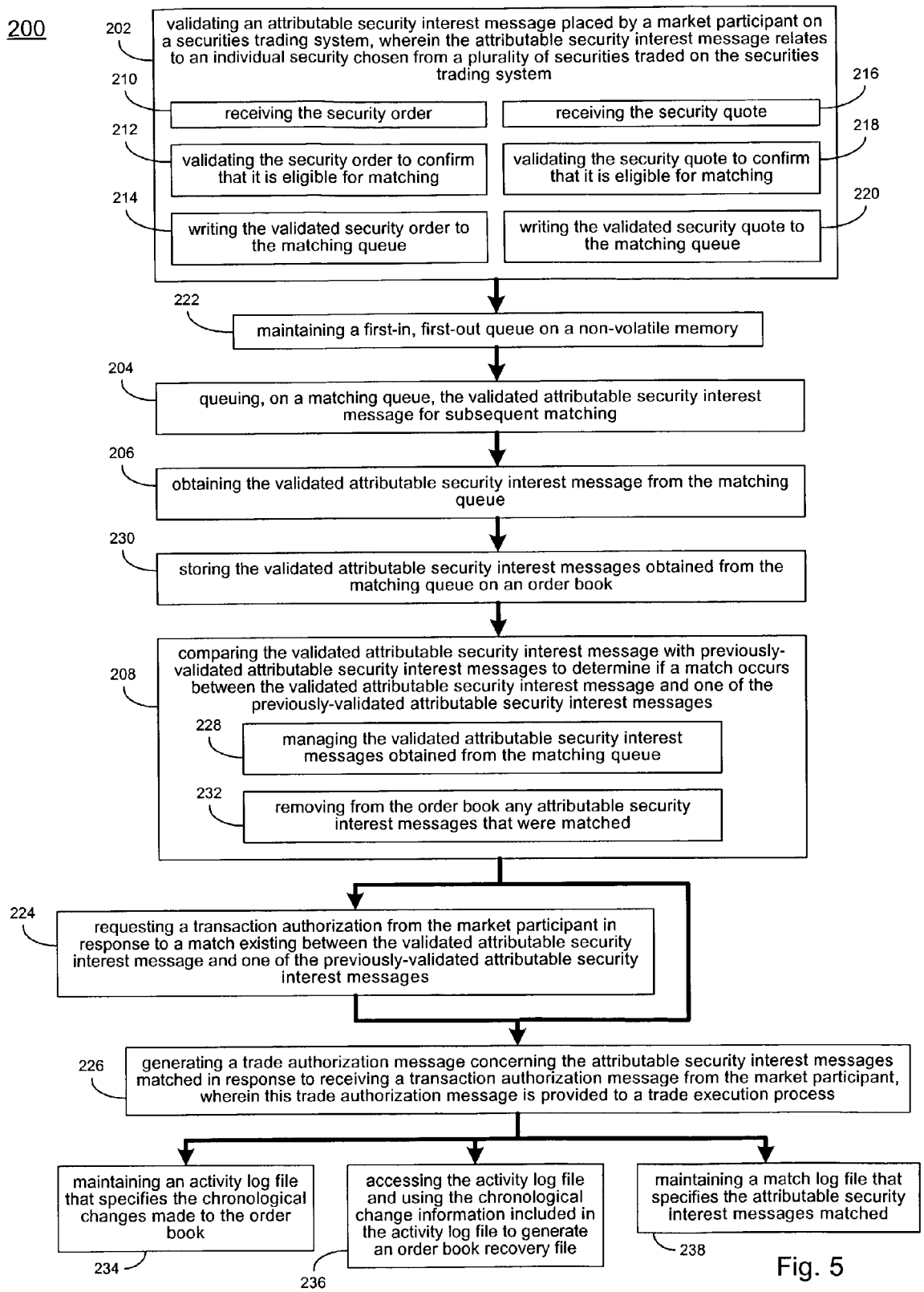
FIG. 5 is a block diagram of a method of processing attributable interest messages.

Referring to FIG. 5, a method 200 of processing attributable interest messages includes validating 202 an attributable security interest message placed by a market participant on a securities trading system. This attributable security interest message relates to an individual security chosen from a plurality of securities traded on the securities trading system.

The validated attributable security interest message is queued 204, on a matching queue, for subsequent matching. The validated attributable security interest message is then obtained 206 from the matching queue, and compared 208 with previously-validated attributable security interest messages to determine if a match occurs between it and one of the previously-validated attributable security interest messages.

The attributable security interest message is a security order and validating 202 includes receiving 210 the security order, and validating 212 it to confirm that it is eligible for matching. Validating 202 further includes writing 214 the validated security order to the matching queue.

The attributable security interest message is a security quote and validating 202 includes receiving 216 the security quote, and validating 218 it to confirm that it is eligible for matching. Validating 202 further includes writing 220 the validated security quote to the matching queue.

The matching queue is a first-in, first-out queue maintained 222 on a non-volatile memory.

A transaction authorization is requested 224 from the market participant whenever a match exists between the validated attributable security interest message and one of the previously-validated attributable security interest messages. A trade authorization message is generated 226 concerning the matched attributable security interest messages in response to receiving a transaction authorization message from the market participant, This trade authorization message is provided to a trade execution process.

The validated attributable security interest messages obtained from the matching queue are managed 228. The validated attributable security interest messages obtained from the matching queue are stored 230 on an order book. Any attributable security interest messages that were matched are removed 232 from the order book. An activity log file is maintained 234 that specifies the chronological changes made to the order book. The chronological change information included in the activity log file is accessed 236 and used to generate an order book recovery file. A match log file is maintained 238 that specifies the attributable security interest messages that were matched.

The securities processor described herein is not limited to the hardware embodiment described above; it may find applicability in any computing or processing environment. The securities processor may be implemented in hardware, software, or a combination of the two. For example, the securities processor may be implemented using circuitry, such as one or more of programmable logic (e.g., an ASIC), logic gates, a processor, and a memory.

The securities processor may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The securities processor may also be implemented as a machine-readable storage medium, configured with a computer program, where, upon execution, instructions in the computer program cause a machine to operate to perform the functions of the securities processor described above.

Embodiments of the securities processor may be used in a variety of applications. Although the securities processor is not limited in this respect, the securities processor may be implemented with memory devices in microcontrollers, general purpose microprocessors, digital signal processors (DSPs), reduced instruction-set computing (RISC), and complex instruction-set computing (CISC), among other electronic components.

Embodiments of the securities processor may also be implemented using integrated circuit blocks referred to as main memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A computer system for processing of trades in financial securities the computer system comprising: a processor device; main memory coupled to the processor device; and a computer readable medium storing a computer program product for processing of attributable security messages for individual securities that are assigned for processing by the securities processor from a plurality of securities that are traded on a securities trading system, the computer program product comprising instructions to cause the computer system processor device to:

electronically validating an attributable security interest message placed by a market participant on a securities trading system to determine whether the attributable security interest message relates to an individual security assigned to be processed by the computer system securities processor, the security chosen from a plurality of securities traded on the securities trading system and to determine whether the attributable security message is eligible for matching; store the validated attributable security interest message in a queue; transfer the validated message from the queue into an order book that resides in a protected portion of the main memory of the computer system securities processor, the order book having a bid side and an offer side; and electronically matching the validated attributable security interest message in a first one of the bid and offer sides of the order book and one of previously-validated attributable security interest messages that reside in a second one of the bid and offer sides of the order book with the instructions to match having exclusive control over the order book.

2. The computer system of claim 1 wherein the attributable security interest message is a security order and the instructions to validate include instructions to validate the security order to confirm that it is eligible for matching.

3. The computer system of claim 2 wherein the instructions to validate include instructions to write the validated security order to the queue.

4. The computer system of claim 1 wherein the attributable security interest message is a security quote and the instructions to validate include instructions to validate the security quote to confirm that it is eligible for matching.

5. The computer system of claim 4 wherein the instructions to validate include instructions to write the validated security quote to the matching queue.

6. The computer system of claim 1 wherein the queue is a first-in, first-out queue maintained on a non-volatile memory.

7. The computer system of claim 1 further comprising instructions to provide a delivery authorization process, responsive to the instructions to match to determine that a match exists between the validated attributable security interest message and one of the previously-validated attributable security interest messages, for requesting a transaction authorization from the market participant.

8. The computer system of claim 7 further comprising instructions to provide an execution reporting process, responsive to the delivery authorization process to receive a transaction authorization message from the market participant, for generating a trade authorization message concerning the attributable security interest messages matched.

9. The computer system of claim 1 wherein the instructions to match include an order management process for managing the validated attributable security interest messages obtained from the matching queue.

10. The computer system of claim 9 wherein the attributable security interest message is a supervisory command and the order management process is configured to process supervisory commands.

11. The computer system of claim 10 wherein the order management process is configured to remove from the order book any attributable security interest messages that were matched by the matching process.

12. The computer system of claim 10 further comprising an activity log file management process, responsive to the order management process, for maintaining an activity log file that specifies the chronological changes made to the order book by the order management process.

13. The computer system of claim 12 further comprising an order file builder process for accessing the activity log file, wherein the order file builder process uses the chronological change information included in the order activity log file to generate an order book recovery file.

14. The computer system of claim 9 further comprising a match log file management process, responsive to the order management process, for maintaining a match log file that specifies the matches made by the matching process.

15. A computer implemented method of processing attributable interest messages, the method executed in a computer of a securities trading system, which t4~is comprised of a plurality of computers, the method comprising:
   electronically validating an attributable security interest message placed by a market participant on a securities trading system to determine whether the attributable security interest message relates to an individual security assigned to be processed by the computer, the security chosen from a plurality of securities traded on the securities trading system to determine whether the attributable security message is eligible for matching;
   queuing, on a queue, the validated attributable security interest message for subsequent matching;
   transfer the validated attributable security interest message from the queue to an order book that resides in a protected portion of main memory of the computer system, the order book having a bid side and an offer side; and
   electronically matching the validated attributable security interest message in a first one of the bid and offer sides of the order book with previously-validated attributable security interest messages in a second one of the bid and offer sides of the order book with matching having exclusive access to the order book.

16. The method of claim 15 wherein the attributable security interest message is a security order and validating includes:
   receiving the security order; and
   validating the security order to confirm that it is eligible for matching.

17. The method of claim 16 wherein validating further includes writing the validated security order to the queue.

18. The method of claim 15 wherein the attributable security interest message is a security quote and validating includes:
   receiving the security quote; and
   validating the security quote to confirm that it is eligible for matching.

19. The method of claim 18 wherein validating further includes writing the validated security quote to the queue.

20. The method of claim 15 wherein the queue is a first-in, first-out queue maintained on a non-volatile memory.

21. The method of claim 15 further comprising requesting a transaction authorization from the market participant in response to a match existing between the validated attributable security interest message and one of the previously-validated attributable security interest messages.

22. The method of claim 21 further comprising generating a trade authorization message concerning the attributable security interest messages matched in response to receiving a transaction authorization message from the market participant, wherein this trade authorization message is provided to a trade execution process.

23. The method of claim 15 wherein matching includes managing the validated attributable security interest messages obtained from the matching queue.

24. The method of claim 23 wherein the attributable security interest message is a supervisory command.

25. The method of claim 23 wherein managing the validated attributable security interest messages is configured to remove from the order book any attributable security interest messages that were matched.

26. The method of claim 15 further comprising maintaining an activity log file that specifies chronological changes made to the order book.

27. The method of claim 26 further comprising accessing the activity log file and using the chronological change information included in the activity log file to generate an order book recovery file.

28. The method of claim 23 further comprising maintaining a match log file that specifies the attributable security interest messages matched.

29. A computer program product residing on a computer readable medium for processing of attributable security messages for individual securities that are assigned for processing by a securities processor executing the computer program product, the assigned securities provided from a plurality of securities that are traded on a securities trading system, having a plurality of instructions stored thereon which, when executed by the processor, cause that processor to:
   electronically validating an attributable security interest message placed by a market participant on a securities trading system to determine whether the attributable security interest message relating to an individual security assigned to be processed by the computer program product, the security chosen from a plurality of securities traded on the securities trading system to determine whether the attributable security message is eligible for matching;

queue, on a queue, the validated attributable security interest message for subsequent matching; transfer the validated messages from the queue into an order book that resides in a protected portion of the main memory of the securities processor, the order book having a bid side and an offer side;

electronically matching the validated attributable security interest message in a first one of the bid and offer sides of the order book and one of previously-validated attributable security interest messages that reside in a second one of the bid and offer sides of the order book with the instructions to match having exclusive control over the order book.

30. The computer program product of claim 29 wherein the attributable security interest message is a security order, the computer program product further comprising instructions to:

receive the security order; and validate the security order to confirm that it is eligible for matching.

31. The computer program product of claim 29 wherein the attributable security interest message is a security quote, the computer program product further comprising instructions to:

receive the security quote; and validate the security quote to confirm that it is eligible for matching.

32. The computer program product of claim 31 further comprising instructions to request a transaction authorization from the market participant in response to a match existing between the validated attributable security interest message and one of the previously-validated attributable security interest messages.

33. The computer program product of claim 32 further comprising instructions to generate a trade authorization message concerning the attributable security interest messages matched in response to receiving a transaction authorization message from the market participant.

34. The computer program product of claim 29 further comprising instructions to remove from the order book any attributable security interest messages that were matched.

35. The computer program product of claim 29 further comprising instructions to maintain an activity log file that specifies the chronological changes made to the order book.

36. The computer program product of claim 35 further comprising instructions to access the activity log file and use the chronological change information included in the activity log file to generate an order book recovery file.

37. The computer program product of claim 29 further comprising instructions to maintain a match log file that specifies the attributable security interest messages matched.

* * * * *